United States Patent [19]
Takasaki et al.

[11] Patent Number: 5,340,960
[45] Date of Patent: Aug. 23, 1994

[54] CONTROL APPARATUS FOR SPOT WELDING ROBOT

[75] Inventors: Denjiro Takasaki; Shuichi Togawa; Akio Kinoshita; Hitoshi Arasuna, all of Kobe, Japan

[73] Assignee: Kawasaki Jukogyo Kabushiki Kaisha, Hyogo, Japan

[21] Appl. No.: 957,108

[22] Filed: Oct. 7, 1992

[30] Foreign Application Priority Data

Oct. 11, 1991 [JP] Japan .................. 3-091512[U]

[51] Int. Cl.⁵ ............................................. B23K 11/00
[52] U.S. Cl. ........................................ 219/86.7; 901/42
[58] Field of Search ................ 219/86.25, 86.7, 86.41, 219/91.1; 901/42

[56] References Cited

U.S. PATENT DOCUMENTS

| | | | |
|---|---|---|---|
| 4,425,073 | 1/1984 | Mattsson | 219/86.41 |
| 4,841,113 | 6/1989 | Hamada et al. | 219/86.41 |
| 4,984,171 | 1/1991 | Tsujii | 219/86.41 |

FOREIGN PATENT DOCUMENTS

| | | |
|---|---|---|
| 278185 | 8/1988 | European Pat. Off. . |
| 3-50631 | 3/1991 | Japan . |
| 2216298A | 10/1989 | United Kingdom . |

*Primary Examiner*—Clifford C. Shaw
*Attorney, Agent, or Firm*—Oliff & Berridge

[57] ABSTRACT

A control apparatus for carrying out a spot welding operation using a robot comprises a spot welding gun having a spot welding tip, an electric drive mechanism for driving the tip, and a control unit for controlling the electric drive mechanism, in which the operation of the spot welding gun is synchronously controlled with that of the robot. The electric drive mechanism is composed of an electric drive servo mechanism comprising a servo amplifier, an electric drive servo-motor and a spot welding tip driving unit. The control unit comprises a central processing unit, a random access memory, a read only memory, a timer and an input/output interface which is operatively connected to the servo mechanism and the spot welding gun. The control apparatus further comprises an input unit, a tip position detector, a robot driving unit and a robot position detector, all of which are connected to the control unit.

12 Claims, 4 Drawing Sheets

CONTROL APPARATUS FOR SPOT WELDING ROBOT

BACKGROUND OF THE INVENTION

The present invention relates to a control apparatus for a spot welding robot particularly capable of controlling opening/closing operations of tips of a direct spot welding gun without utilizing a hydraulic or pneumatic controlling device.

In a conventional art of an automobile manufacturing line, for example, spot welding robots R have been utilized. Such a spot welding robot utilizes a spot welding gun operated by hydraulic or pneumatic means as shown in FIG. 7, which is a schematic diagram of a conventional spot welding robot controlling system. The system of FIG. 7 comprises a hydraulic or pneumatic tip elevating unit 101, a tip elevating member 102, a pneumatic or hydraulic control unit 103, called fluid control unit hereinafter and a robot control unit 104. The hydraulic control unit 103 has a construction basically different from a robot control unit 104 which is mainly composed of electric elements or parts. Therefore, the hydraulic control unit 103 cannot be integrally combined with the robot control unit 104, and hence, these control units 103 and 104 are independently installed. In an operation of welding a workpiece W, the robot control unit 104 controls a control element of the hydraulic control unit 103 thereby indirectly controlling the operation of a spot welding gun G having a tip G1 which opens and closes in both the directions shown by an arrow onto tip 621, thus making the control system more complex, resulting in increased cost of manufacture and maintenance of the entire apparatus.

Furthermore, the hydraulic control unit 103 of the conventional apparatus includes piping means, cylinder means and valve means, each of which has a certain capacity or volume, resulting in that time delay in operation may be likely caused. Accordingly, it is difficult to synchronously control the hydraulic control unit with the robot control unit mainly composed of electric elements having less time delay in operation. For this reason, in the prior art, as shown in FIG. 8, because it is difficult to perform synchronous control it is not possible to perform opening, closing and welding operation of the spot welding gun G while the robot is moving. Therefore, the robot has to be first moved without operating the gun at this time and moved to the position for welding. Then, only the gun has to be moved and the series of operations of closing→welding→opening are then performed. In particular, the following steps are performed:

Step 1: The robot is at standby at the original point.
Step 2: Axis 1 and axis 2 are started and the robot is moved to the escape point close to the welding point, then to the welding point.
Step 3: The gun is closed after the robot has arrived at the welding point, and the operation commences.
Step 4: The gun is closed, and the welding starts after the work is held at a required pressure.
Step 5: The welding finishes.
Step 6: The gun opening work starts, and after the gun has opened to a certain extent, the robot operation for moving to the escape point close to the welding point and to the origin starts.
Step 7: The robot returns to the origin, and axis 1 and axis 2 stop.

Thus this requires much time for the spot welding, resulting in a significant problem in an automobile industry in which an improved production efficiency on the production line is increasingly required.

In order to obviate such defects of a spot welding gun G utilizing the fluid control unit 103 of the prior art, there is provided a spot welding gun utilizing an induction motor as disclosed in the Japanese Patent Publication (KOKOKU) No. 3-50631 (50631/1991).

However, a spot welding gun utilizing the induction motor includes a servo mechanism, which differs from that of the robot control unit, and accordingly, in order to synchronously operate such a spot welding gun utilizing the induction motor with the robot control unit, another independent control unit is required between this spot welding gun and the robot control unit, thus increasing the cost and making the apparatus itself complicated. Thus, synchronous operation cannot be easily achieved and the entire welding time cannot be remarkably shortened. Therefore, it is difficult to directly or easily apply conventional spot welding guns to spot welding robots.

SUMMARY OF THE INVENTION

An object of the present invention is to substantially eliminate defects or drawbacks encountered in the prior art and to provide a control apparatus for a spot welding robot capable of simplifying the control opening/closing operation of the tip of the spot welding gun and synchronizing the control means with the robot and other robot operation mechanism, thereby shortening the entire spot welding time.

This and other objects can be achieved according to the present invention by providing an apparatus for a spot welding robot for carrying out a spot welding operation by means of a robot, the control apparatus comprising:

a spot welding gun having a spot welding tip;
an electric drive means for driving the tip; and
a control means for controlling the electric drive servo mechanism,
wherein the operation of the spot welding gun is synchronously controlled with that of the robot as one axis means of the robot.

In a preferred embodiment, the electric drive means is composed of an electric drive servo mechanism comprising a servo amplifier, an electric drive servomotor and a spot welding tip driving unit. The servo amplifier may be comprised of a thyristor amplifier or a transistor amplifier. The control means comprises a central processing unit, a random access memory, a read only memory, a timer and an input/output interface which is operatively connected to the servo mechanism and the spot welding gun.

The control apparatus further comprises an input unit, a tip position detector, a robot driving unit and a robot position detector, all of which are connected to the control means.

According to the control apparatus having the characteristics described above, the tip opening/closing operation, the pressing operation of the tip, and the robot moving operation are synchronized by means of the electric drive servo mechanism, so that the time required for spot welding can be remarkably shortened. This advantage can be improved even further in the case where multiple welding points are welded.

The nature and features of the control apparatus for a spot welding robot according to the present invention

DESCRIPTION OF THE PREFERRED EMBODIMENTS

Figure 1:
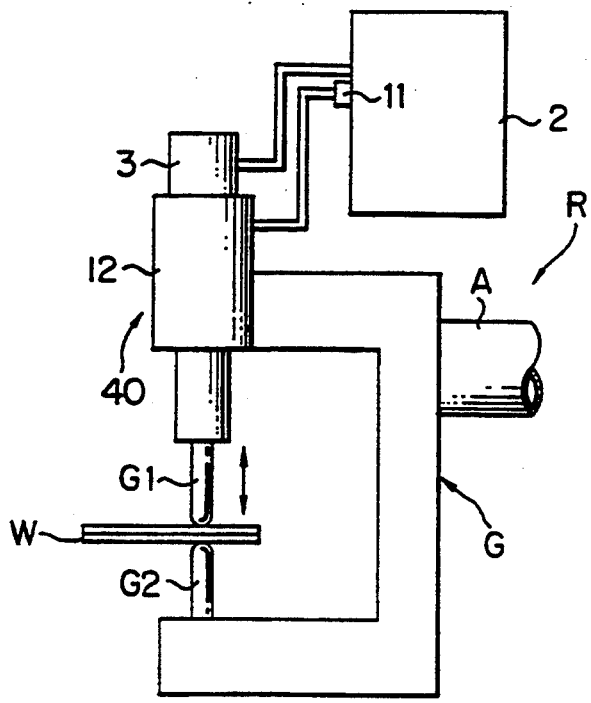
FIG. 1 is a schematic diagram representing one embodiment of a control apparatus for a spot welding robot according to the present invention.

A structure or construction of a control apparatus for a spot welding robot R according to the present invention will be described hereunder with reference to FIGS. 1 to 3, in which the control apparatus generally comprises an electric drive servo mechanism 1, a robot control unit 2, a tip position detector 3 and a spot welding gun G, and a reference character W denotes a workpiece to be spot welded.

The control apparatus including the spot welding gun G according to the present invention is shown in FIG. 1, which comprises the robot control unit 2 to which a servo amplifier 11 is operatively connected, a servo motor 12 electrically connected to the control unit 2, a tip position detector 3, a spot welding gun G provided with tips G1 and G2 for the spot welding, and a tip driving unit 13 for driving the tips.

In detail, referring to FIGS. 1 to 4 the electric drive servo mechanism I is composed of a servo amplifier 11, an electric drive servo motor 12 electrically connected to the servo amplifier 11 and a tip drive unit 13 for the spot welding operatively connected to the servo motor 12. The electric drive servo mechanism 1 is held by a body portion of the spot welding gun G by a suitable means.

The servo amplifier 11 is assembled for the purpose of supplying power for rotating the servo motor 12 at the instructed rotation angle or rotation speed, and any kind of the servo amplifier may be utilized as long as it attains these functions without limiting its specific structure. As one example, a thyristor amplifier or transistor amplifier may be utilized for the servo amplifier.

The electric servo motor 12 is assembled for the purpose of driving the tip drive unit 13 in accordance with required welding conditions. Any kind of the electric drive servo motor may be utilized as long as it drives the tip drive unit 13 without limiting its specific structure to such as one utilized in a conventional servo mechanism. As one example, a brushless electric DC motor may be utilized if required by complicated welding conditions.

Figure 2:
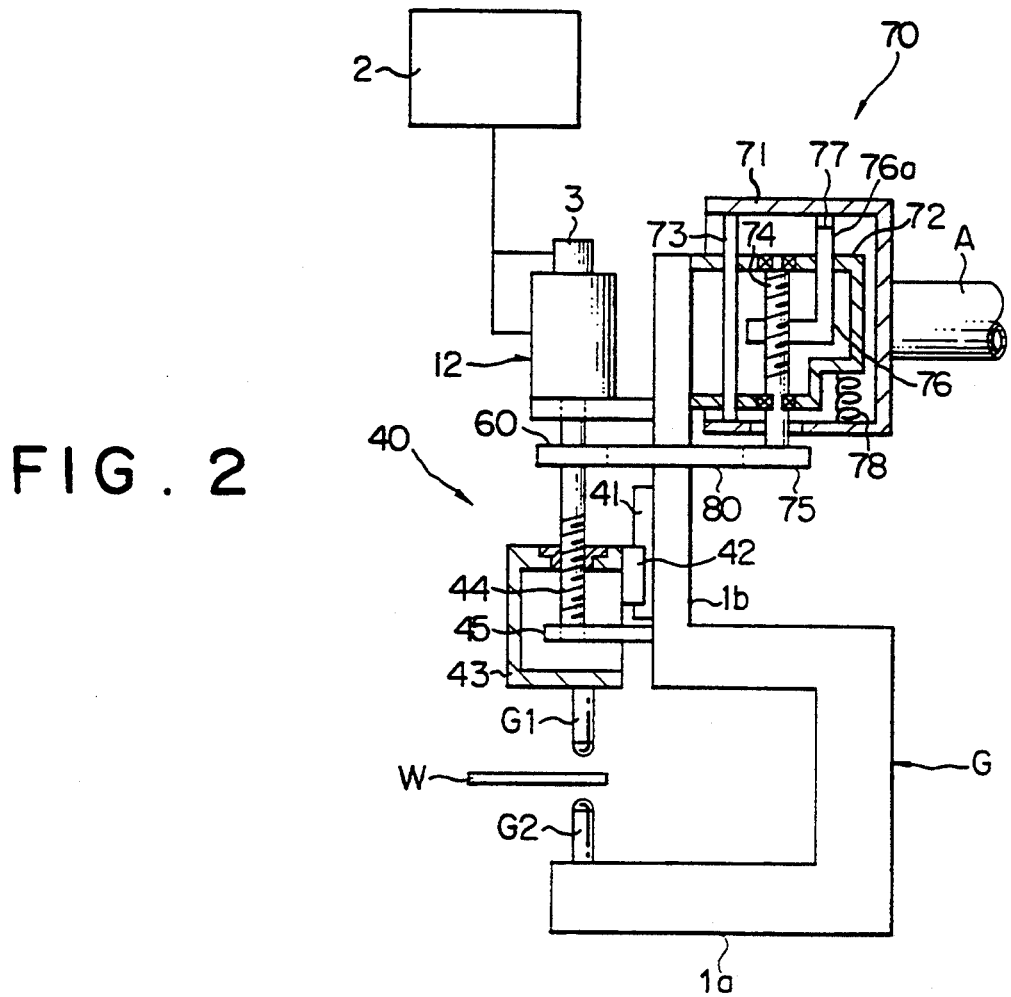
FIG. 2 is a schematic diagram showing an upper side tip moving mechanism of the spot welding robot of FIG. 1.
Figure 3:
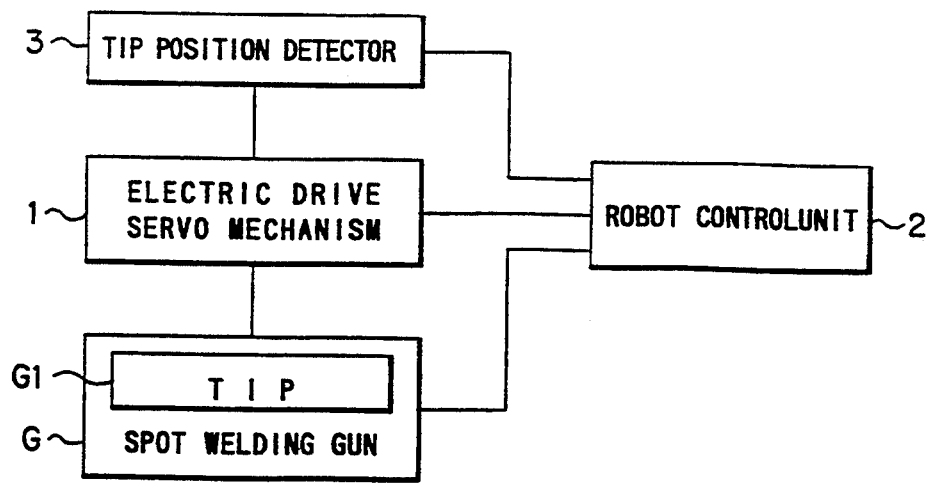
FIG. 3 is a block diagram showing a main structure of the control apparatus of FIG. 1.

As shown in FIG. 2, the spot welding gun G comprises a lower side member 1a and an axis member 1b which extends vertically from the lower side member 1a to form a shape similar to a reversed letter C. To this lower member 1a is provided a conventional spot welding gun and in the same manner, a lower side tip G2. To the upper portion of this lower side tip G2 is provided a conventional spot welding gun and in the same manner, an upper side tip G1. This upper side tip G1 rises and lowers by the upper side tip moving mechanism 40 arranged to the rear end of the tip.

The upper side tip moving mechanism 40 comprises a guide member 41 which is held in the axis member 1b, a sliding member 42 which slidably engages with the guide member 41, a frame member 43 which holds the sliding portion member 42, a ball screw 44, the distal end of which is housed in the frame member 43 and the other end of which protrudes from the surface of the frame member 43, and a bearing member 45 which passes through an opening portion of the frame member 43 which holds the ball screw 44 so that it is freely rotatable and which is fixed to the axis member 1b. To the lower surface of this frame member 43 is formed a male screw which engages with the ball screw 44. By this, the frame member 43 can move up and down due to the rotation of the ball screw 44. Accordingly, the upper side tip G1 moves up and down in accordance with the up and down motion of the frame member 43.

Above the upper side tip movement mechanism 40 is provided a servo motor 12. This servo motor 12 is held from the axis member 1b by a suitable means. The distal end of the shaft of the servo motor 12 engages with the distal end of the ball screw 44 which extends from the upper surface of the frame member 43. Also, a circular pulley 60 is provided concentrically to this shaft.

An equalizing mechanism 70 is arranged to the side opposite the servo motor 12. The equalizing mechanism 70 comprises an outer frame member 71 held in a robot wrist A and an inner frame member 72 which engages as a unit with the axis member 1b. The outer frame member 71 has a guide rod 73. This guide rod 73 slidably engages with the inner frame member 72. Also, the inner frame member 72 has a ball screw 74. The upper end of this ball screw 74 rotatably holds the bearing by the upper surface of the inner frame member 72. The lower end of the ball screw 74 protrudes from the bottom surface of the outer frame member 71. At a position where the ball screw 74 passes through the surface of the inner frame member 72, the ball screw 74 is provided to a bearing in the same manner as at the upper surface, and is freely rotatable. To the lower end of the ball screw 74 is concentrically provided a pulley 75. Furthermore, the ball screw 74 engages with the L-shaped slide rod 76. The vertical portion 76a of this slide rod 76 protrudes from the upper surface of the inner frame member 72. The portion of the vertical portion 76a which passes through the upper surface of the inner frame member 72 is slidably held by the inner frame member 72. The length of this vertical portion 76a is adjusted so that when it is in the position where it protrudes the most, it contacts the buffer member 77 provided to the inner of the upper surface of the outer side frame member 71. To the inner side of the lower surface of the outer frame member 71 is provided the servo motor 12, which is input to the robot controller 2. The robot controller 2 uses this measured (i.e., the value that is measured when portion 72a contacts buffer member 77) value as the basis for performing adjustment of the amount of movement.

The ball screws 44, 74 are arranged so that the upper side tip G1 and the lower side tip G2 can move in opposite directions at the same time. This is to say that the ball screw 44 and the ball screw 74 have opposite directions of rotation.

The following is a description of the operation of the equalizing mechanism having the configuration described above.

When the workpiece W is set at the required position, an instruction from the robot controller 2 rotates the servo motor 12. By this action the ball screw 44 rotates and the frame member 43 lowers. Accordingly, the upper side tip G1 provided vertically to the lower surface of the frame member 43 lowers. On the other hand, the belt 80 causes the ball screw 74 to rotate at the same time as the rotation of the servo motor 12. The slide rod 76 therefore lowers. The inner frame member 72 is always urged upwards by the spring member 78 and so rises to oppose the lowering of the slide rod 76. When the inner frame member 72 rises, the spot welding gun G which is connected as a unit to it also rises. Accordingly, the lower side tip G2 provided to the spot welding gun G also rises. When the upper side tip G1 has moved a required amount, an instruction from the robot control unit 2 stops the servo motor 12. The spot welding then commences.

In this manner, according to the present invention, the movement of the lower side tip G2 and the upper side tip G1 is performed by the ball screws 44, 74 and so it is possible for the workpiece to be held between the upper side and the lower side tips without any impact forces being applied to the workpiece.

Since the servo mechanism 1 has a structure thus described, a workpiece W can be surely clamped and a predetermined pressing force can be ensured in response to a command from the robot control unit 2.

Figure 4:
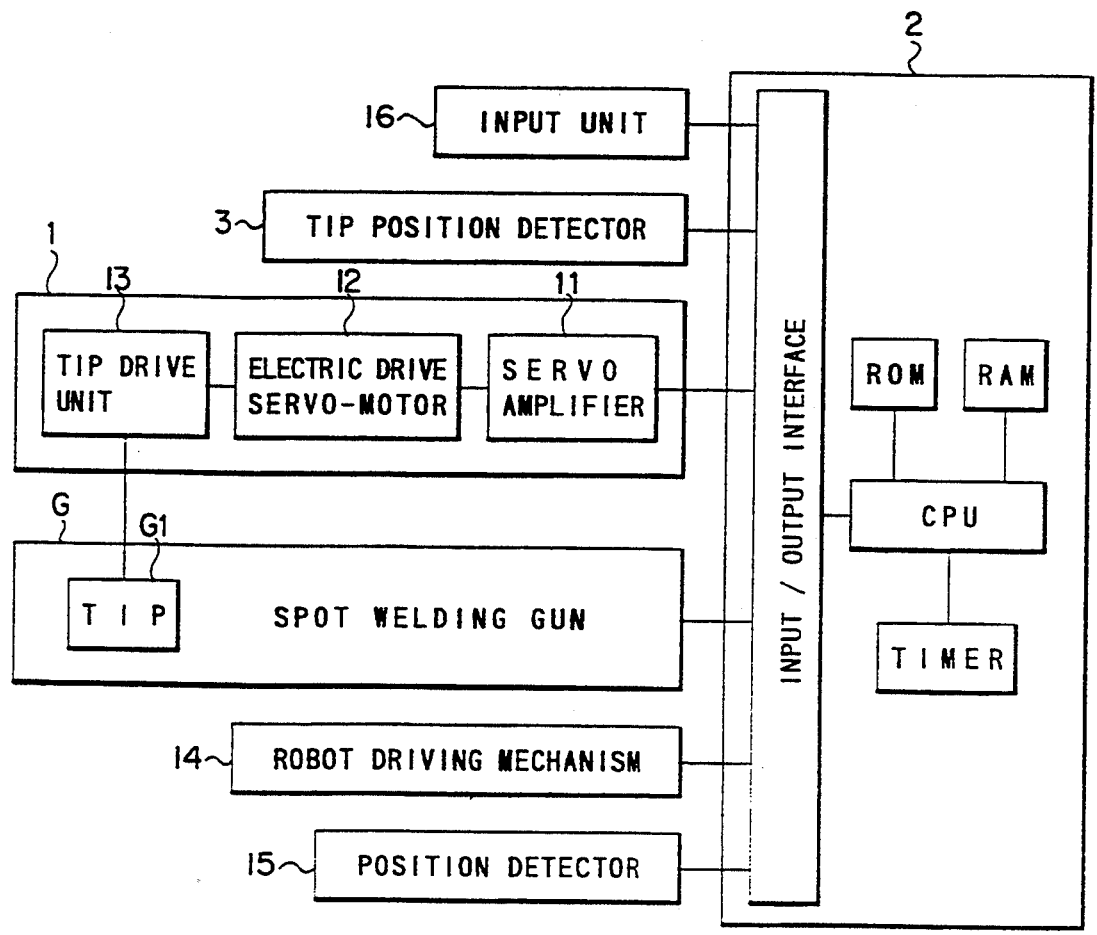
FIG. 4 is a detailed block diagram showing the electrical connection of the control apparatus of FIG. 3.

As shown in FIG. 4, the robot control unit 2 is comprised of a central processing unit (CPU), a random access memory (RAM), a read only memory (ROM), a timer and an input/output interface, which are all electrically connected. The robot control unit 2 is operatively connected to the electric servo mechanism 1 and the tip position detector 3, as well as to an input unit 16, a robot drive mechanism 14 and a robot position detector 15. The detail of the robot control unit 2 is substantially identical to a conventional one except that information necessary for the control of the servo mechanism 1 is programmed.

Information relating to the gun operation control and to robot operation are written beforehand to the ROM, and the position information for the operation objective point of the robot gun is taught to one RAM (teaching operation). The CPU performs control of robot gun operation on the basis of operation control information written to the ROM, from information such as position detector information obtained via the input/output interface and the operation objective point which is taught to the RAM.

The tip position detector 3 is arranged to the rear end portion of the servo motor 12, and the tip position detector 3 comprises a rotation number detecting means for detecting the rotating number of the servo motor 12 and an output means for outputting the detected rotating number to the robot control unit 2.

Figure 5:
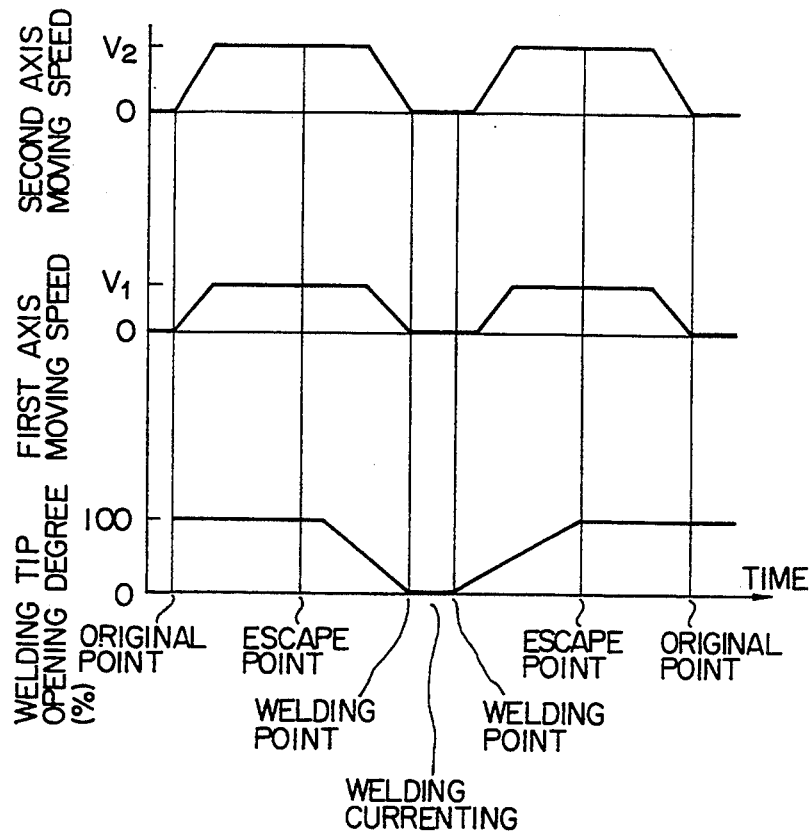
FIG. 5 is one example of a time chart concerning the operation of a robot operated by the control apparatus of FIG. 1.

The spot welding operation of a robot having two robot axes by utilizing the thus constructed spot welding robot control apparatus will be described hereunder in accordance with the following operation steps with reference to the time chart of FIG. 5.

Step 1: The robot waits at its original (start) point.
Step 2: The first and second axes are driven and the robot is then moved to an escape point near a welding point.
Step 3: When the robot has reached the escape point near the welding point, the electric servo mechanism is driven to narrow a gap between the tips (welding tip opening degree).
Step 4: The tips hold a work to be welded with a predetermined pressing force at a time when the robot has reached the welding point.
Step 5: Welding operation (welding currenting) starts.
Step 6: The welding operation is completed.
Step 7: The pressing operation by the servo mechanism has been completed, the gap between the tips (welding tip opening degree) is widened, and the robot is retracted to the escape point near the welding point.
Step 8: The robot has reached the escape point, the gap between the tips returns to an initial state, and the operation of the servo mechanism is stopped.
Step 9: The robot returns to its original point and the driving of the first and second axes is stopped.

In the spot welding control apparatus of the present invention, a servo mechanism the same as that of a conventional robot performs control of the spot welding gun and so it is not necessary to have a separate control apparatus or the like between the robot control unit 2 and the servo mechanism 1, and it is possible to use the same method for the control of the spot welding gun and the robot axis. Because of this, the spot welding gun can be thought of as being equivalent to a single axis which has been added to the robot and it is possible for synchronous control of the welding gun to also be facilitated in the same manner as conventional synchronous control of a robot axis.

As described above and as can be seen from FIG. 5, according to the present invention, the movement, i.e. operation of the robot, the opening/closing operation of the tips of the welding gun and the pressing operation of the tips can be synchronously carried out, thus shortening the total welding time.

Figure 6:
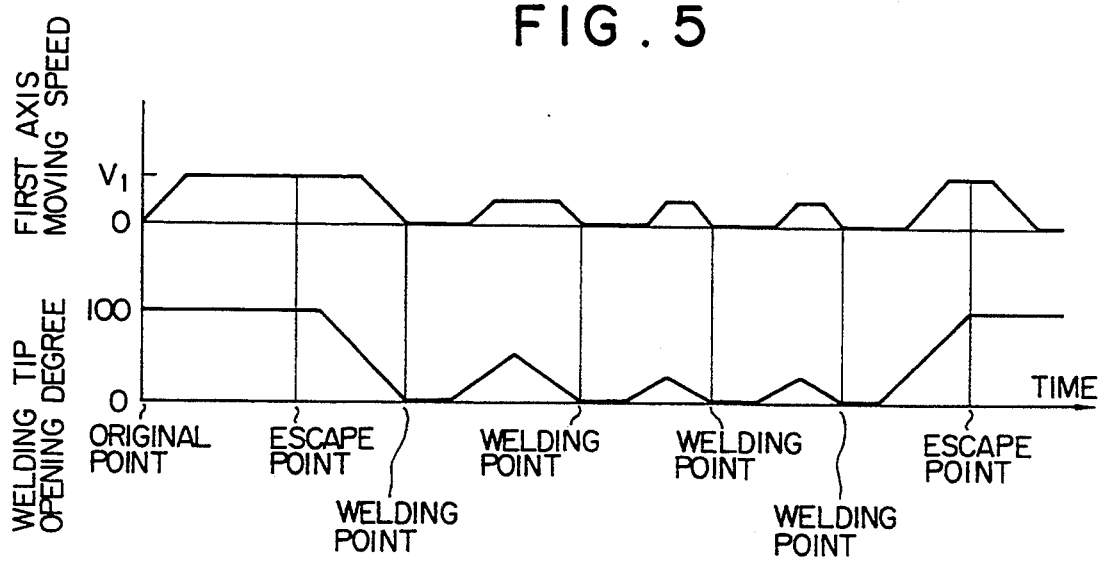
FIG. 6 is another example of the time chart of FIG. 5.
Figure 7:
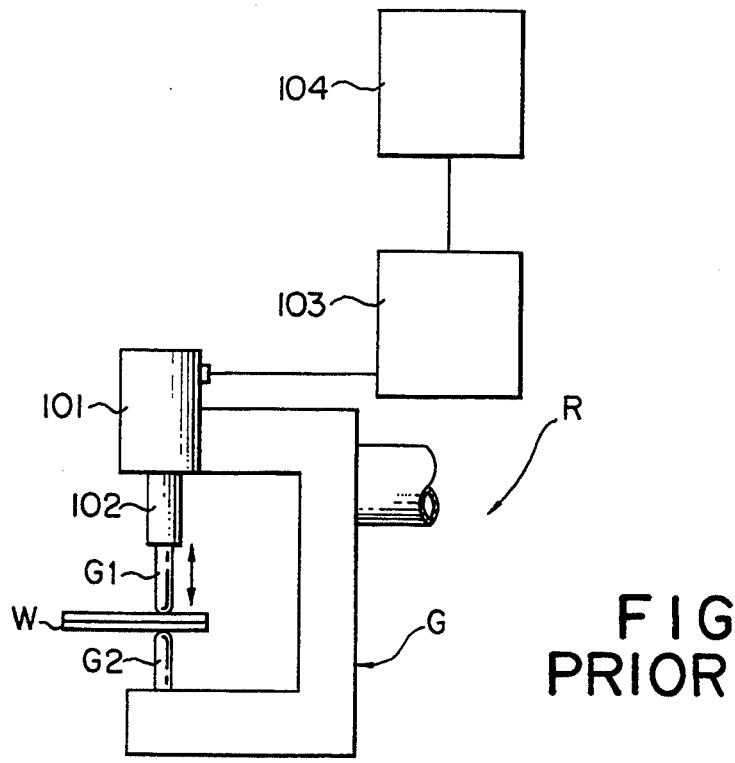
FIG. 7 is a schematic diagram representing a control apparatus for a spot welding robot according to the prior art.
Figure 8:
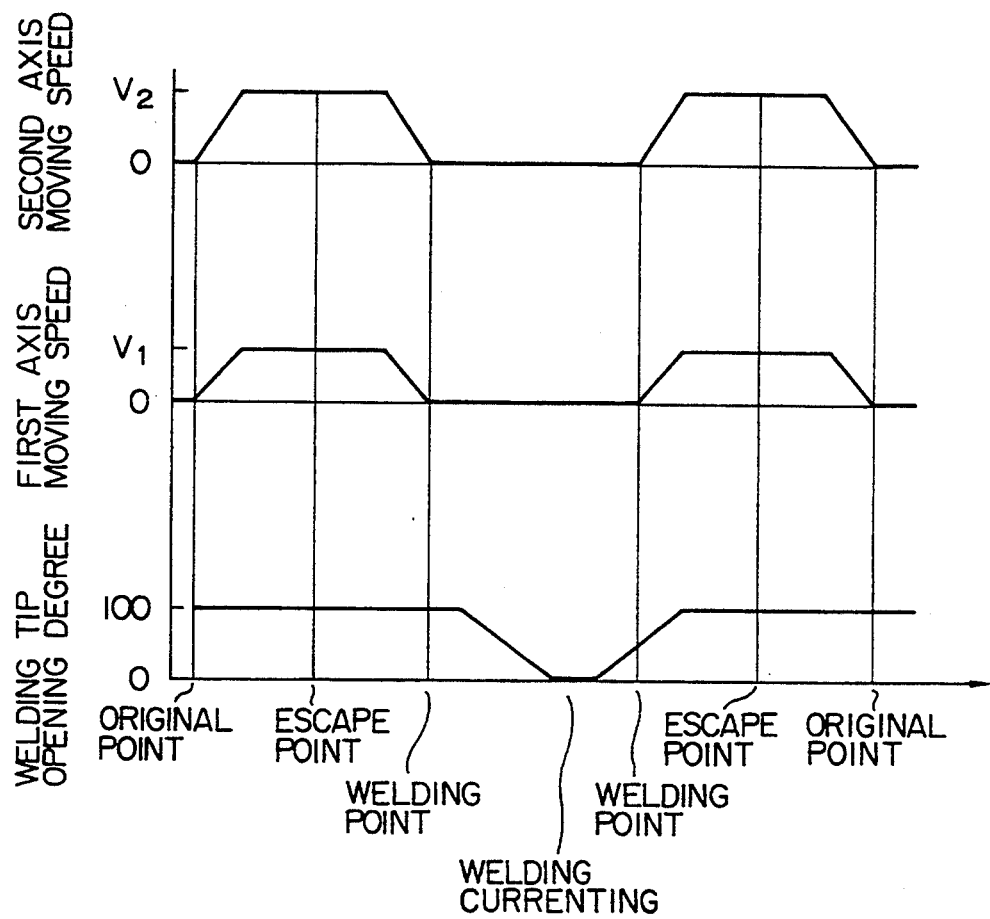
FIG. 8 is one example of a time chart of the operation of the conventional apparatus of FIG. 7.

FIG. 6 shows another time chart according to another example of the present invention, and as can be seen from FIG. 6, according to the control apparatus of the present invention, it is not necessary to fully open the gap between the tips of the welding gun. The width of the gap can be controlled as required in accordance with the operations of the robot, so that the operating time of the spot welding gun at the welding time can be remarkably shortened in a case where many welding points are present, thus also remarkably shortening the entire welding time.

It is to be noted that the present invention is not limited to the described embodiment and many other changes or modifications may be made without departing from the scope of the appended claims.

What is claimed is:

1. A control apparatus for a spot welding robot for carrying out a spot welding operation by means of a robot comprising:
 a spot welding gun having a spot welding tip;
 an electric drive servo mechanism for driving the spot welding tip; and
 a control means or controlling the electric drive servo mechanism so that the operation of the spot welding gun is synchronously controlled with the operation of the robot so as to function as one axis of the robot.

2. The control apparatus according to claim 1, wherein said electric drive servo mechanism comprises a servo amplifier, an electric drive servo-motor coupled to said servo amplifier and a tip drive unit coupled between said electric drive servo-motor and said spot welding tip.

3. The control apparatus according to claim 2, wherein said servo amplifier is a thyristor amplifier.

4. The control apparatus according to claim 2, wherein said servo amplifier is a transistor amplifier.

5. The control apparatus according to claim 1, wherein said control means comprises a central processing unit, a random access memory coupled to said central processing unit, a read only memory coupled to said central processing unit, a timer coupled to said central processing unit and an input/output interface which is operatively connected to said central processing unit, said servo mechanism and said spot welding gun.

6. The control apparatus according to claim 1, further comprising an input unit coupled to said control means, a tip position detector coupled to said control means, a robot driving mechanism coupled to said control means and a robot position detector coupled to said control means.

7. A control apparatus for a spot welding robot for carrying out a spot welding operation by means of a robot that is movable along at least one robot movement axis, comprising:
a spot welding gun having a spot welding tip that is movable in a longitudinal direction along a welding tip axis between open and closed positions;
an electric drive servo mechanism for driving the spot welding tip in said longitudinal direction; and
a single controller that directly controls the electric drive servo mechanism and said robot to move said spot welding tip in said longitudinal direction along said welding tip axis toward said closed position while moving said robot along said at least one robot movement axis toward a welding position and to move said spot welding tip in said longitudinal direction along said welding tip axis toward said open position while moving said robot along said at least one robot movement axis away from the welding position.

8. The control apparatus according to claim 7, wherein said electric drive servo mechanism comprises a servo amplifier, an electric drive servo-motor coupled to said servo amplifier and a tip drive unit coupled between said electric drive servo-motor and said spot welding tip.

9. The control apparatus according to claim 8, wherein said servo amplifier is a thyristor amplifier.

10. The control apparatus according to claim 8, wherein said servo amplifier is a transistor amplifier.

11. The control apparatus according to claim 7, wherein said control means comprises a central processing unit, a random access memory coupled to said central processing unit, a read only memory coupled to said central processing unit, a timer coupled to said central processing unit and an input/output interface which is operatively connected to said central processing unit, said servo mechanism and said spot welding gun.

12. The control apparatus according to claim 7, further comprising an input unit coupled to said control means, a tip position detector coupled to said control means, a robot driving mechanism coupled to said control means and a robot position detector coupled to said control means.

* * * * *